United States Patent [19]

Bondarev et al.

[11] Patent Number: 5,243,181
[45] Date of Patent: Sep. 7, 1993

[54] NOISE-INSENSITIVE, PHOTOELECTRIC TRANSCEIVER INCLUDING A DIGITAL STABILITY INDICATOR

[75] Inventors: Vadim Bondarev, Bellevue; Scott M. Juds, Seattle, both of Wash.

[73] Assignee: Eaton Corporation, Cleveland, Ohio

[21] Appl. No.: 894,712

[22] Filed: Jun. 5, 1992

[51] Int. Cl.$^5$ .............................................. H01J 40/14
[52] U.S. Cl. .................................. 250/214 B; 250/221
[58] Field of Search ................. 250/214 B, 221, 222.1, 250/223; 307/311; 340/555, 556, 557

[56] References Cited

U.S. PATENT DOCUMENTS

| | | | |
|---|---|---|---|
| 4,356,393 | 10/1982 | Fayfield | 250/214 R |
| 4,381,446 | 4/1983 | Fukuyama et al. | 250/214 R |
| 4,644,341 | 2/1987 | Warner | 340/753 |
| 4,851,660 | 7/1989 | Juds et al. | 250/214 H |
| 4,931,631 | 6/1990 | Jackson | 250/221 |
| 5,099,113 | 3/1992 | Oi et al. | 250/214 B |
| 5,142,134 | 8/1992 | Kunkel | 250/221 |

*Primary Examiner*—David C. Nelms
*Attorney, Agent, or Firm*—Christensen, O'Connor, Johnson & Kindness

[57] ABSTRACT

This invention provides a photoelectric transceiver (10) for detecting the presence and absence of objects (16) in a selected region (12). The transceiver (10) includes a light source (18), a light sensor (22), and electronic circuitry (13). The transceiver (10) generates a timing signal (MDCLK) that synchronizes its operation. In synchrony with the timing signal, the transceiver emits pulses of light (14) into the selected region (12) and senses light (24) coming from the selected region. When an object (16) is present in the selected region (12), the emitted light pulses (14) are reflected back to the transceiver (20). Based upon the light sensed, the transceiver generates an output (OUTOD) indicating whether or not an object is present. The transceiver includes three features that reduce the effect of interfering noise on the output (OUTOD). First, the output (OUTOD) is generated by a digital count hysteresis process to reduce the effect of random noise. Second, the transceiver timing signal (MDCLK) is modulated between two frequencies to reduce the effect of repetitive noise. Third, the transceiver timing signal (MDCLK) is interrupted when interfering noise is detected to further reduce the effect of noise. The transceiver includes a digital stability indicator (42) that indicates whether the transceiver operation is stable.

20 Claims, 6 Drawing Sheets

NOISE-INSENSITIVE, PHOTOELECTRIC TRANSCEIVER INCLUDING A DIGITAL STABILITY INDICATOR

FIELD OF THE INVENTION

This invention relates to devices for object detection and, more particularly, photoelectric transceivers for detecting the presence or absence of objects.

BACKGROUND OF THE INVENTION

Devices for detecting the presence of objects have been available for several years and have been used in various applications. Security systems for both home and commercial settings use various sensors for detecting intruders. In the manufacturing industry, object sensors have been used for various purposes, e.g., detecting objects along an assembly line. Typically, manufacturing sensing systems are set up to detect the presence or absence of an object in a certain selected region. One specific manufacturing application involves the assembly of cardboard boxes. Assembly lines exist for automatically forming cardboard boxes, i.e., forming a box with a bottom and four sides. However, because such assembly lines are not fail proof, defective boxes are occasionally produced. Some assembly lines incorporate a sensor system for automatically detecting defective boxes. The detection systems detect whether each of the sides of a box has been properly erected. Such sensing systems incorporate several sensors for detecting the presence or absence of box sides.

One category of object detection devices currently available are photoelectric transceivers that emit and sense light. Such a transceiver is oriented to emit light into a preselected region. If there is an object in the region, the emitted light is reflected off the object. When the transceiver senses that the light it emitted has been reflected back, the transceiver provides an output signal indicating that an object is present.

One type of photoelectric transceiver emits pulses of light, as opposed to continuous light, so that constant ambient light does not affect the transceiver. The sensing of light by such transceivers is synchronized with the emission of light pulses as only light pulses sensed at the times that light pulses are emitted are indicative of an object. While such sensors are not affected by constant ambient light, other types of noise can cause the sensors to give false detections. Interfering noise can come from several sources, including other pulsating light sources, external electromagnetic noise, and electrical noise within the sensing device itself. In many applications, including manufacturing, false indications of an object's presence can cause serious problems. In such applications, it is important that the detection system be immune to noise.

While photoelectric transceivers currently available have some noise immunity features, they are not completely effective, particularly in the presence of synchronous or nearly synchronous noise. Other transceivers operating nearby are one example of a source of synchronous noise. In most object detection systems, several transceivers are used. For example, in the previously described application of cardboard box manufacturing, at least four transceivers are used to detect each of the four box sides. Unfortunately, one of the transceivers may detect the light emitted by one of the other transceivers resulting in transceiver interference. Transceiver interference can cause a transceiver to falsely indicate that an object is present. The present invention provides a low-power photoelectric transceiver that solves this and other noise problems. The transceiver of this invention is highly insensitive to both synchronous and asynchronous noise.

Additionally, photoelectric transceivers are adjusted during both initial installation and periodic maintenance of the detection system. The gain of a transceiver is adjusted so that the transceiver detects objects only in a desired region and not, for example, some background object such as a wall. A technician adjusting the gain of a transceiver needs some sort of indication of the strength of back-reflected light that a transceiver is receiving. Transceivers are currently available with signal strength indicators that serve this function. The very first and simplest photoelectric signal strength indicator was simply an on/off indicator which told you that you either had enough or did not have enough signal strength for detection. This signal strength indication was one and the same as the detection indication, i.e., the sensor output status indicator. Numerous improvements have since been offered in the prior art for a variety of purposes. One such method is the subject of the Fayfield U.S. Pat. No. 4,356,393 which teaches an LED indicator that blinks at a rate proportional to the signal strength. Another method is the subject of the Warner U.S. Pat. No. 4,644,341, which teaches the addition of an LED bar graph display to indicate the minimum and maximum light received and thereby the contrast. Another method is the subject of the Juds U.S. Pat. No. 4,851,660, which teaches an LED indicator which is driven to produce a brightness proportional to the logarithm of the detected signal strength. A stability indicator is one type of signal strength indicator. One stability indicator found in the prior art uses comparators to turn on an LED stability indicator when the received signal strength is in a window defined around the detection threshold.

Unfortunately the prior art of the Fayfield U.S. Pat. No. 4,356,393 and the Juds U.S. Pat. No. 4,851,660 patent, while being useful during the initial installation and alignment of the sensor, are not useful for preventative maintenance of ongoing operations because the relative LED flashrate (Fayfield) and the brightness (Juds) as judged at a later time is so subjective that one cannot tell by observing the LED indicator how much margin remains before slight vibration or dust build up will result in detection failure. The LED bar graph of the Warner U.S. Pat. No. 4,644,341 will indicate marginal operation prior to detection failure, however, the combination of required space for the bar graph display and the attendant cost of the display render it impractical and non-competitive for use in modern miniature low cost photoelectric sensors. Prior art stability indicators which do address the aforementioned problems implement fixed analog comparator thresholds, typically around twice and half of the detection threshold in order to generate the stability LED indicator signal. This method, unfortunately, makes an a priori assumption about both the optical cleanliness of the sensor environment and the electrical and optical noise present in the sensor environment. By fixing these thresholds, any of numerous low contrast applications in clean benign environments will indicate unstable operation even though this is not the case.

The present invention overcomes the aforementioned problems through a digital implementation which indicates unstable operation. The digital stability indicator provides correct stability indication even in low signal-to-noise contrast situations. Furthermore, implementation by digital means as described herein provides for a smaller less costly circuit.

SUMMARY OF THE INVENTION

In accordance with this invention, a photoelectric transceiver for detecting the presence and absence of objects in a selected region is provided. The photoelectric transceiver includes a light source, e.g., a light emitting diode (LED), a light sensor, e.g., a photodiode, and electronic circuitry for driving the LED and processing the output of the photodiode so as to determine whether or not an object is present in a selected region. The electronic circuitry includes a front end circuit, a sample and compare circuit, a digital integrator, a modulator, and an LED drive. The front end circuit is coupled to the photodiode, the sample and compare circuit and the modulator. The sample and compare circuit, the digital integrator and the modulator are each coupled to each other. The LED drive is coupled to the LED and the modulator. In operation, the LED drive causes the LED to emit pulses of light into the selected region. If an object is present, the light pulses are reflected back to the transceiver and sensed by the photodiode. The transceiver processes the photodiode output signal to determine whether an object is present.

The modulator generates a timing signal that includes a sequence of pulses for synchronizing the operation of the transceiver. Light pulses are generated by the LED at times synchronized with the pulses of the timing signal. The front end circuit amplifies and filters the photodiode output signal to produce an output signal representative of the light sensed. The output signal is sampled by the sample and compare circuit at times synchronized with the pulses of the timing signal. The result of this sampling is provided to the digital integrator. The digital integrator maintains a count indicative of the number of times that emitted LED pulses are and are not reflected back. Based upon this count, the digital integrator generates an internal signal indicative of one of three states: a terminal state indicating that no object is being detected, a terminal state indicating that an object is being detected, and a transition state indicating transitioning between the terminal states of object being detected and no object being detected. When the integrator is in either of the terminal states, the timing signal produced by the modulator has a constant first frequency. When the digital integrator is in the transition state, the timing signal is successively frequency modulated between the first frequency and a second frequency.

In accordance with further aspects of the invention, the transceiver generates an output signal indicating one of two output states: object present, or no object present. The digital integrator forms this output signal by processing its internal state. When the integrator is in one of the terminal states, the output signal indicates the corresponding state, e.g., if the integrator is in the terminal state indicating that an object is being detected, the output signal indicates that an object is present. The output signal is characterized by hysteresis in that it only changes when the integrator assumes a new terminal state; the output signal remains constant when the integrator is in the transition state.

In accordance with still further aspects of the invention, the modulator interrupts the timing signal when the photodiode detects potentially interfering noise, e.g., a light spike, at a time other than the times at which LED pulses are emitted. The front end circuit produces a second output signal representative of light and electromagnetic noise sensed by the photodiode. The modulator monitors this output signal and interrupts the modulator operation if interfering noise is detected at a time other than the times at which LED pulses are emitted. When such interfering noise is detected, the modulator pauses for a preselected period of time before generating the next timing pulse, so that the transceiver does not attempt to emit and detect its own LED pulse in the presence of interfering noise. Then the modulator resumes generating timing pulses at either the first frequency or the second frequency.

In accordance with still further aspects of the invention, the electronic circuitry includes a stability indicator that generates an output signal indicative of whether the transceiver operation is stable. The stability indicator is coupled to the modulator and the integrator, and generates an internal stability signal by processing the internal state of the digital integrator. The internal stability signal represents either a state of stable operation, a state of unstable operation, or a state of transition between the state of stable operation and the state of unstable operation. When the internal state of the integrator consistently indicates that either an object is being detected or is not being detected, the internal stability signal represents the stable state. Otherwise, the stability indicator generates the internal stability signal to represent the unstable state. The stability indicator processes the internal stability signal so as to generate an output stability signal characterized by hysteresis. The output stability signal indicates either stable transceiver operation or unstable transceiver operation. When the internal stability signal represents either the stable state or the unstable state, the output stability signal represents the same state. The output stability signal is characterized by hysteresis in that it does not change when the internal stability signal represents the transition state.

As will be appreciated from the foregoing brief summary, a photoelectric transceiver for reliably detecting the presence and absence of objects in a preselected region is provided by this invention. Pulses of light are emitted by the transceiver, which are reflected back and sensed by the transceiver when an object is present. The transceiver generates an output signal to indicate whether or not an object is present. The transceiver includes three features that make the transceiver substantially immune to noise. First, the process that generates the output signal is such that the output signal will not indicate that an object is present unless light pulses are consistently reflected back to the transceiver. The output signal will continue to indicate that an object is present until emitted light pulses are consistently not reflected back. This reduces the effect of random noise on the output signal.

Second, as will be further appreciated from the foregoing brief summary, the transceiver provided by this invention uses frequency modulation to reduce the effect of repetitive noise, including signals from other similar transceivers. Normally, the transceiver generates light pulses at a constant frequency. If previously there was no object present, but now the light sensed by the transceiver indicates that an object may be present, the transceiver switches to generating light pulses at successively alternating frequencies. As a result of successively alternating between two frequencies, many types of repetitive noise cannot falsely trigger the transceiver.

Third, as will be further appreciated from the foregoing brief summary, the transceiver uses a noise avoidance sequence so as to further reduce the effect of noise, including signals from other similar transceivers. The transceiver senses time-varying noise, e.g., light or electromagnetic pulses and spikes, during the time periods between light pulses emitted by the transceiver itself. When the transceiver senses a noise spike or pulse at a time when it did not emit a light pulse, the transceiver interrupts its operation and pauses for a preselected period of time before generating the next light pulse. As a result, the transceiver shifts the times at which it generates light pulses so that the noise pulse or spike does not interfere with the light pulses generated by the transceiver.

It will be still further appreciated from the foregoing brief summary that the transceiver includes a stability indicator that indicates whether the transceiver operation is stable, i.e., whether the output of the transceiver is reliable. The stability indicator utilizes a digital logic process. It will be appreciated that the stability indicator, as well as the majority of the other functions provided by the transceiver, can be implemented with digital circuitry. As a result, the transceiver provided by this invention can be produced inexpensively.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
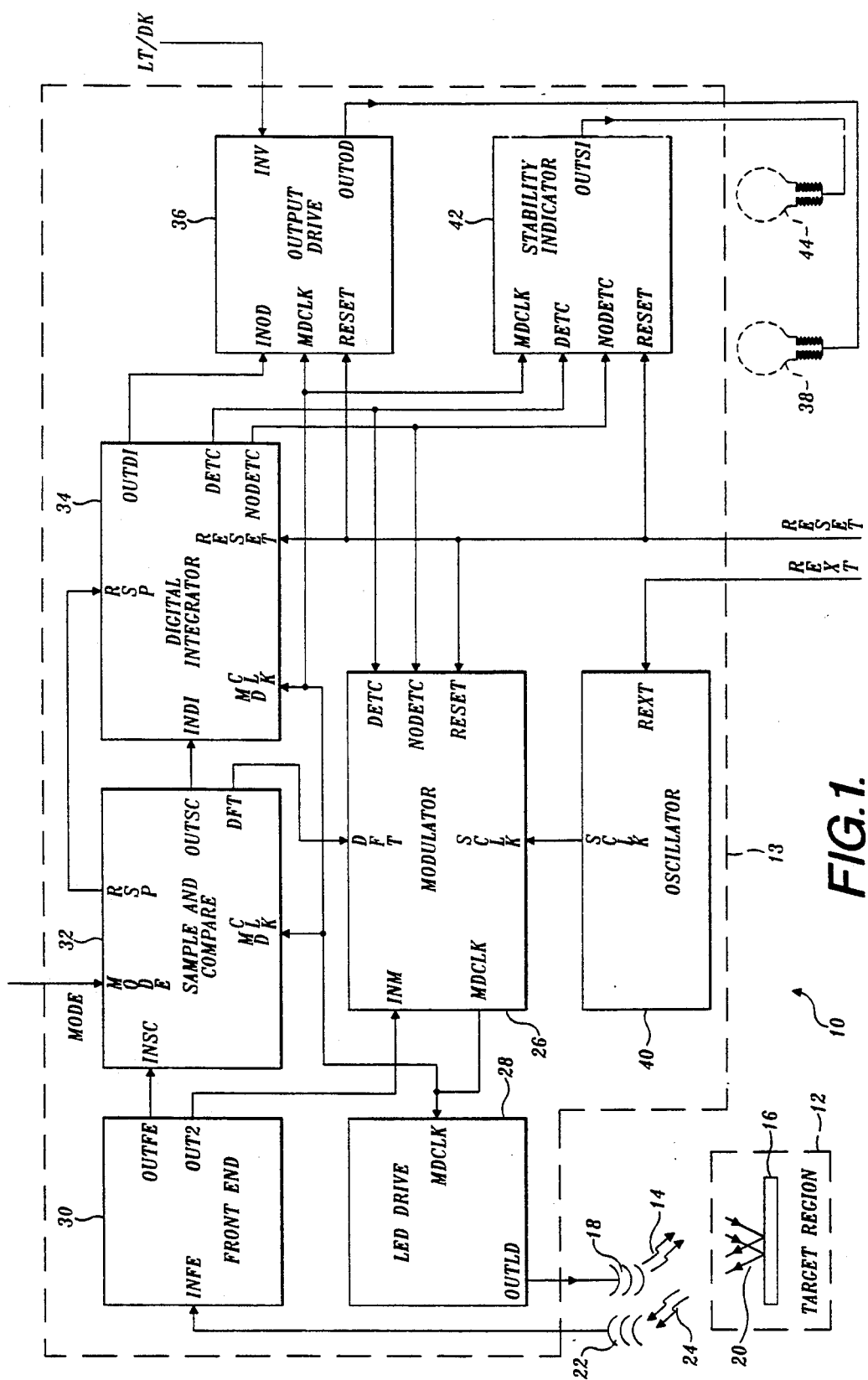
FIG. 1 is a block diagram of a transceiver according to the invention for detecting the presence and absence of objects in a selected region.

FIG. 1 is a block diagram of a photoelectric transceiver 10 formed in accordance with the invention for detecting the presence of objects in a selected region 12. The transceiver 10 detects the presence of objects in the target region 12 by emitting pulses of light 14 and detecting when the light pulses 14 are reflected back by an object 16. The transceiver 10 includes a light source 18, electronic circuitry 13, and a light sensor 22. The light source 18, e.g., a light emitting diode (LED), emits pulses of light 14 towards the target region 12. If there is an object 16 in the target region, a reflection 20 of the light pulses occurs at the object 16. The light sensor 22, e.g., a photodiode, is positioned to sense any back-reflected light pulses 24. The electronic circuitry 13 drives the LED 18 and processes the signal produced by the photodiode 22 so as to determine whether there is an object in the target region 12.

The electronic circuitry 13 of the transceiver includes a modulator circuit 26, an LED drive circuit 28, a front end circuit 30, a sample and compare circuit 32, a digital integrator 34, output drive circuit 36, an oscillator 40, and a stability indicator circuit 42. The modulator 26 produces a timing signal that synchronizes the operation of the transceiver. The LED drive circuit 28 drives the LED 18 so that light pulses 14 are produced synchronously with the timing signal. The front end circuit 30 filters and amplifies the signal produced by the photodiode 22 and produces two output signals designated OUTFE and OUT2. The sample and compare circuit 32 samples the output signal OUTFE and provides an output signal OUTSC indicative of whether the emitted light pulses 14 were reflected back. The digital integrator 34 processes the sample and compare output signal OUTSC so as to generate internal signals indicative of whether or not an object is being detected or whether a state of transition exits. The digital integrator 34 uses a digital count hysteresis process to produce an output signal OUTDI indicating that an object is either present or not present. The digital count hysteresis process reduces the effect of random noise on the output signal OUTDI. The output drive circuit 36 receives the output signal OUTDI from the digital integrator and drives an external device 38 (such as an LED) to provide an indication of whether an object is present.

The oscillator 40 generates a system clock signal that is the time base of the transceiver. The frequency of the timing signal produced by the modulator 26 is a fraction of the frequency of the system clock signal, the fraction depending on the internal signals produced by the digital integrator 34. The modulator 26 varies the fraction, i.e., modulates the frequency of the timing signal, in a manner that makes the transceiver insensitive to repetitive noise, including signals from another similar transceiver.

The stability indicator circuit 42 receives the internal signals produced by the digital integrator and generates an output signal OUTSI indicative of whether or not the transceiver is operating in a stable manner. The output signal OUTSI is applied to an external device 44 that provides an external indication of stability. The indication of stability can be used when installing and performing maintenance on the transceiver (e.g., when adjusting the transceiver gain) and for monitoring the operation of the transceiver.

The components of the transceiver 10 are coupled together with specific input and output interconnections. The timing signal produced by the modulator 26 is provided at an output MDCLK. The LED drive circuit 28, the sample and compare circuit 32, the digital integrator 34, the output drive circuit 36 and the stability indicator circuit 42 each have an input labeled MDCLK that is connected to the output MDCLK of the modulator 26 to receive the timing signal. Referring to the timing diagram in FIG. 5, the timing signal MDCLK consists of a sequence of pulses 46. The LED drive circuit 28 receives the timing signal and generates an electrical drive signal at its output OUTLD that is connected to the LED 18. The drive signal causes the LED to produce light pulses at times synchronized with the timing signal, represented as the waveform 48 in FIG. 5. The waveform 50 represents the electrical signal produced by the photodiode 22. When an object is present in the target region (e.g., time period 52), the light pulses emitted by the LED are reflected back and sensed by the photodiode (represented by pulses). When no object is present (e.g., time period 54), the waveform 50 contains no pulses.

The front end circuit 30 has an input INFE, connected to the photodiode 22 to receive the photodiode signal, and the two outputs OUTFE and OUT2. The front end circuit 30 preferably includes an adjustable amplifier stage that amplifies the photodiode signal and a filter stage that filters the output of the amplifier stage and produces the output signals OUTFE and OUT2. The filter stage preferably provides band-pass filtering followed by low-pass filterings. The band-pass filtering results in the output signal OUT2, and this signal is then low-pass filtered to produce the output signal OUTFE as the low frequency contents of the output signal OUT2.

The sample and compare circuit 32 has an input INSC that is connected to the output OUTFE of the front end circuit 30. The sample and compare circuit 32 determines the strength of the output signal OUTFE both at the times of the timing pulses and at times between timing pulses and compares the signal strengths. The result of this comparison indicates whether a pulse of light was sensed by the photodiode at the times of the timing pulses, and the result is provided at the output OUTSC of the sample and compare circuit.

The digital integrator 34 has an input INDI connected to the output OUTSC. The digital integrator processes the signal OUTSC so as to generate internal signals indicative of one of several defined states. Two terminal states are defined: an object-being-detected state and an object-not-being-detected state. Several transition states indicating a transition between the terminal states are also defined. The integrator processes its internal state to generate an output signal that takes on one of two values: one indicating an object is present, the other indicating no object is present. The output signal is provided at the output OUTDI that is connected to the input INOD of the output drive circuit 36. The output drive circuit 36 provides a drive signal at the output OUTOD connected to the external device 38.

The sample and compare circuit 32 has an input MODE that allows selecting the mode of operation of the transceiver 10. The input MODE can be used to specify either a fast or a slow response rate of the digital integrator 34. Specifically, the sample and compare has an output RSP connected to an input RSP of the digital integrator that specifies the minimum amount of time to transition between the two terminal states of the digital integrator. The input MODE is also used to specify the duty factor of the timing signal MDCLK, i.e., the ratio between width of each pulse and the period of the timing signal. Specifically, the sample and compare has an output DFT that is connected to an input DFT of the modulator 26 to specify the timing signal duty factor.

The digital integrator 34 also has an output DETC that indicates whether the internal state of the integrator is the state of object-being-detected, and an output NODETC indicating whether the internal state is the state of object-not-being-detected. The outputs DETC and NODETC are connected to respective DETC and NODETC inputs of the modulator 26 and the stability indicator circuit 42. The stability indicator circuit 42 processes the inputs DETC and NODETC to produce an output signal that is provided at the output OUTSI. The output OUTSI is connected to some external device 44 (such as an LED).

The modulator 26 has an input INM connected to the output OUT2 of the front end circuit 30. Based upon the input signals DETC, NODETC and OUT2, the modulator 26 frequency modulates the timing signal MDCLK so that at certain times the timing signal consists of pulses generated at a first frequency $f_1$, at other times at a second frequency $f_2$, and at certain times the generation of pulses is briefly interrupted.

The oscillator 40 provides a system clock at an output SCLK that is connected to an input SCLK of the modulator 26. The frequency of the system clock SCLK is dictated by the value of an external resistor connected to an input REXT of the oscillator. The frequencies $f_1$ and $f_2$ of the timing signal MDCLK are fractions of the system clock frequency.

Digital Integrator

The digital integrator 34, the modulator 26 and the stability indicator circuit 42 preferably utilize digital logic. As state diagrams are commonly used to specify digital logic, the logic of the digital integrator, the modulator and the stability indicator circuit are specified in the state diagrams of FIGS. 2-4. Using these state diagrams, persons skilled in digital electronics design can program currently available digital processors or design custom state machines, using currently available logic gates and memory, to perform the specified logic.

Figure 2:
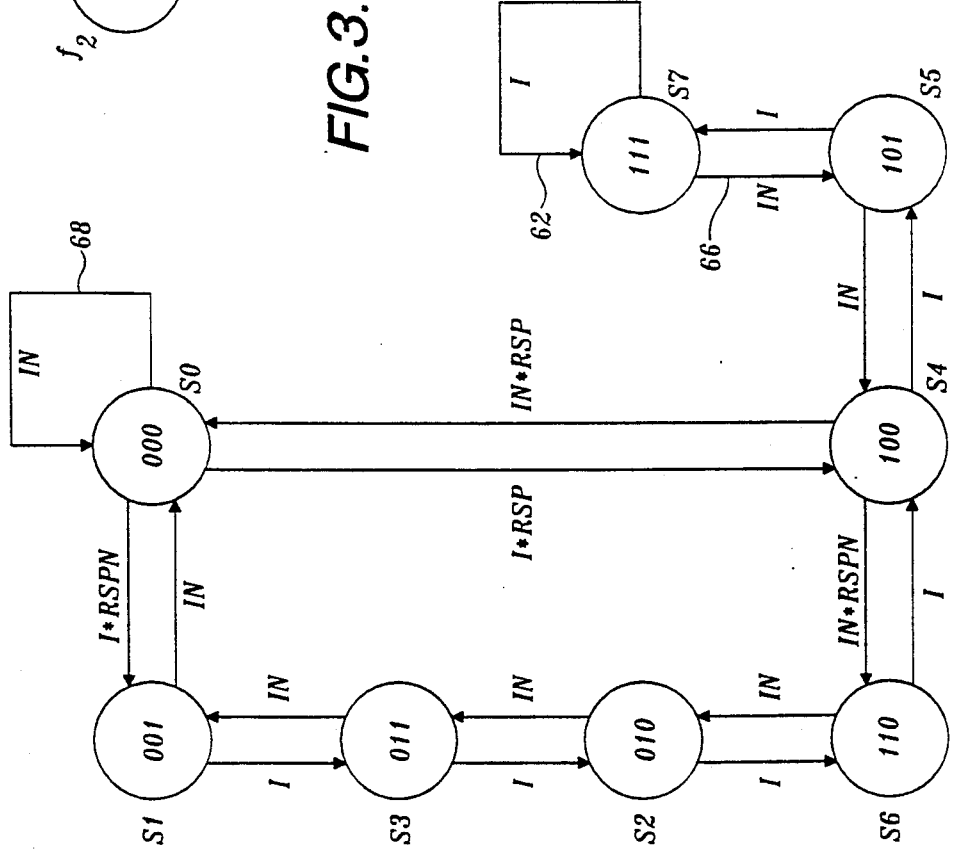
FIG. 2 is a state diagram specifying the operation of the digital integrator shown in FIG. 1.

FIG. 2 is a state diagram specifying the process for controlling the internal state of the digital integrator 34. As is well known by those skilled in the digital design art the circles in the state diagram represent the states and the arrows connecting the circles represent the transition between states. The binary number within each circle is a number assigned to the particular state; the number is also shown outside each circle as a decimal number preceded by the letter "S".

The digital integrator operates synchronously with the timing signal MDCLK so that the internal state of the digital integrator can only change after each pulse of the timing signal. The synchronous operation of the integrator is represented by the solid arrows interconnecting the circles of the state diagram; dashed arrows are used to represent asynchronous state transitions. (See FIG. 3.) The letters beside each arrow indicate the condition that has to exist in order for the transition from the state connected to the tail of the arrow to the state connected to the head of the arrow to occur. The letter "I" is a Boolean variable that indicates whether or not the photodiode 22 detected a light pulse at the time of the latest pulse of the timing signal MDCLK. More specifically, the Boolean variable I is true (i.e., satisfied) if the photodiode detected a light pulse and the Boolean variable IN (i.e., I-not) is true if a pulse was not detected. For example, referring to the timing diagram in FIG. 5, at the time of the pulse 56 of the timing signal 46 an object is present in the target region. Accordingly, the photodiode detects a pulse of light at this time, as indicated by the pulse 58 of the photodiode signal 50. At this time the Boolean variable I is true and IN is false (i.e., not satisfied). In contrast, at the timing pulse 60 there is no object present so that the photodiode detects no light and the Boolean variable IN is true.

The state diagram in FIG. 2 consists of the two terminal states, object-being-detected S7 and object-not-being-detected S0, and several transition states S1-S6 representing some point along a transition between the two terminal states. The length of transition between the two terminal states S0 and S7 depends upon whether the fast or slow response mode has been selected via the input RSP of the digital integrator. This is represented in the state diagram as two paths interconnecting the terminal states S0 and S7. The Boolean variable RSP is true if the fast response mode is selected and the Boolean variable RSPN is true if the slow response mode is selected. When the slow response mode is selected, the transition path consisting of states S1, S3, S2, S6, S4 and S5 is followed in transitioning between the terminal states S0 and S7. When the fast response mode is selected, the Boolean variable RSP is true and the transition path consisting of the states S4 and S5 is traced. The state diagram indicates which path is taken by the conditions I*RSPN, I*RSP, IN*RSP, and IN*RSPN, where "*" is the Boolean AND operation.

Figure 5:
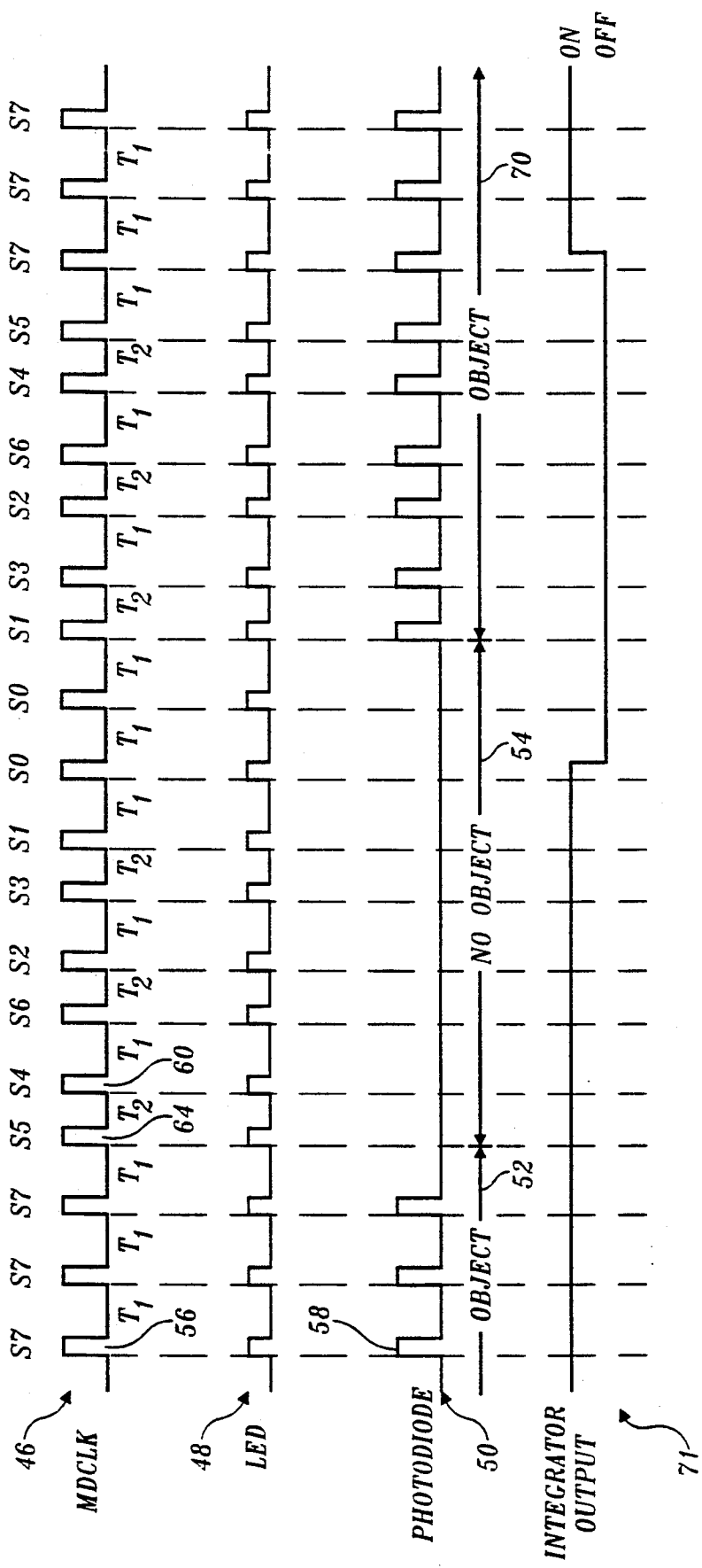
FIG. 5 is a timing diagram illustrating the operation of a transceiver according to this invention in the presence and absence of an object.

The logic specified in FIG. 2 can be illustrated with reference to the timing diagram in FIG. 5. Assuming that an object has been present in the target region for some time, the digital integrator would be in the terminal state S7, i.e., object-being-detected. This is illustrated in FIG. 5 by the time period 52 and the state S7 shown above the pulses of the timing signal 46. During this time period 52, a light pulse is detected by the photodiode at the time of each timing pulse so that the Boolean variable I is true. As a result, the terminal state S7 remains active as indicated by the loop 62 in FIG. 2.

During the time period 54, the internal state of the integrator transitions from the terminal state S7 to the terminal state S0 because no object is present in the target region. Assuming that the slow response mode has been selected (i.e., RSPN is true), the longer transition path consisting of S5, S4, S6, S2, S3 and S1 is traversed. At the time of timing pulse 64, no object is present so that the photodiode detects no light pulse and the Boolean variable IN is true. As a result, the internal state changes from the state S7 to the state S5 (indicated by arrow 66). Similarly, at subsequent pulses of the timing signal the Boolean variable IN is true so that the internal state of the digital integrator successively changes from S5 to S4, then to S6, then to S2, then to S3, then to S1, and finally to the terminal state S0 (indicated by the states shown above the timing signal during the time period 54). The terminal state S0 remains active so long as no object is present (indicated by the loop 68). After the time period 54 expires, an object is again present in the target region. Accordingly, the internal state of the digital integrator transitions from the terminal state of S0 to the terminal state of S7 along the same path but in the opposite direction.

When the fast response mode is selected (i.e., RSP is true), the transition between the terminal states S0 and S7 is similar—but faster. When the slow response mode is selected, the transition path includes six transition states so that the minimum time to transition between the terminal states S0 and S7 is seven pulses of the timing signal MDCLK. When the fast response mode is selected there are two transitions states (i.e., S4 and S5), so that the minimum time to transition between the terminal states is three pulses.

The output signal OUTDI produced by the digital integrator 34 is formed by processing the internal state of the digital integrator so that the output signal OUTDI is characterized by hysteresis. The output signal OUTDI of the digital integrator has two states: object present, and no object present. When the internal state of the digital integrator is the terminal state S7 (i.e., object-being-detected), the output signal OUTDI indicates that an object is present. When the internal state of the digital integrator is the terminal state S0 (i.e., no-object-being-detected), the output signal OUTDI indicates that no object is present. The output signal OUTDI exhibits hysteresis in that the output signal does not change when the internal state of the digital integrator is any of the transition states S1-S6; the output signal OUTDI does not change until the internal state of the digital integrator assumes a new terminal state. This is illustrated by the waveform 71 shown in FIG. 5, wherein ON represents object present and OFF represents no object present.

Figure 3:
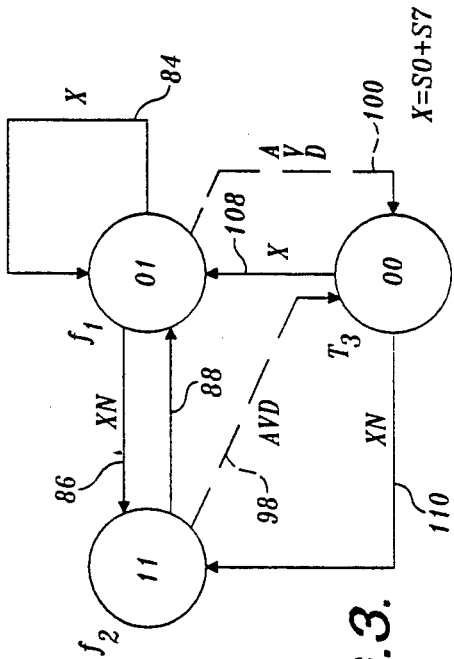
FIG. 3 is a state diagram specifying the frequency modulation scheme of the modulator shown in FIG. 1.
Figure 6:
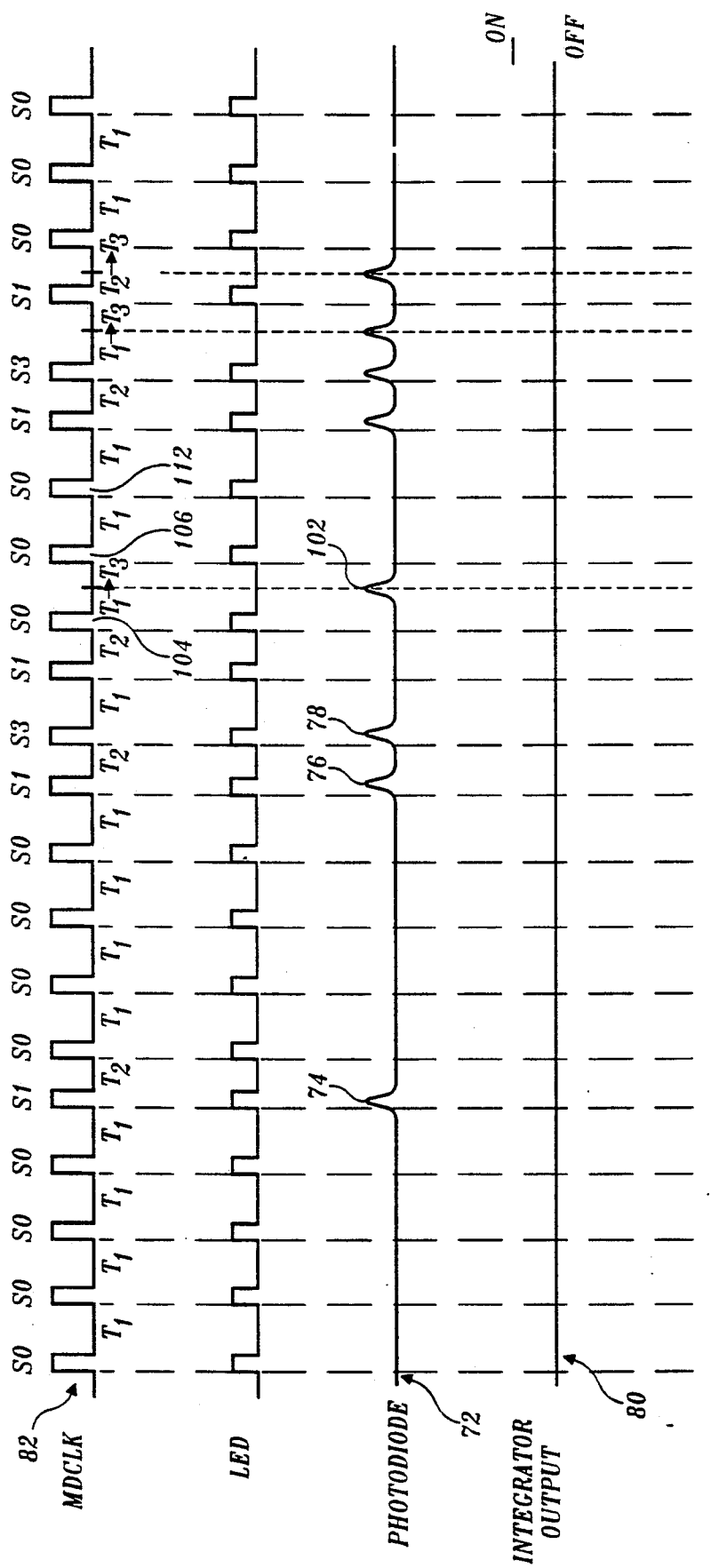
FIG. 6 is a timing diagram illustrating the operation of a transceiver according to this invention in the presence of random noise.

By providing the output signal OUTDI with digital hysteresis, the effect of random noise is reduced. The timing diagram of FIG. 6 illustrates the situation in which there is no object present but there are random spikes of noise as represented on the photodiode signal 72. The spikes shown, e.g., spike 74, represent optical noise coming from the target region or internal or external electromagnetic noise affecting the transceiver. The spikes 74, 76 and 78 shown occur at times coinciding with pulses of the timing signal and appear to be reflected LED pulses, therefore causing the internal state of the digital integrator to change. However, the output OUTDI of the integrator is not affected. As indicated by the waveform 80, the output of the digital integrator consistently indicates that no object is present. Furthermore, after each of the spikes 74, 76 and 78 occur, the internal state of the digital integrator quickly returns to the terminal state S0 (illustrated by the internal states shown above the timing signal 82). Modulator FIG. 3 is a state diagram that specifies the process by which the modulator 26 modulates the frequency of the timing signal MDCLK. The pulses of the timing signal MDCLK are generated at one of two frequencies, $f_1$ or $f_2$, depending upon the state of the modulator 26. As shown in FIG. 3, the modulator has three states. When the modulator is in the state labeled 01, timing pulses are generated at the first frequency $f_1$, and when the modulator is in the state labeled 11, the timing pulses are generated at the second frequency $f_2$. When the modulator is in the state labeled 00, the generation of timing pulses is interrupted for a period of time $T_3$.

The Boolean variables X and XN shown in FIG. 3 are defined as follows:

X=S0+S7

XN=S7N*S0N

As will be readily recognized by those skilled in the digital electronics art, the symbol + represents the Boolean OR function, and the symbol * represents the Boolean AND operation. The Boolean variable X is true when the digital integrator is in either of the terminal states S0 or S7, and XN is true when the digital integrator is in neither of the terminal states, i.e., when the digital integrator is in one of the transition states S1-S6.

The state of the modulator depends upon the internal state of the digital integrator 34 and on whether a light pulse is sensed by the photodiode 22 at some time other than the times at which light pulses are emitted by the LED 18. As explained in greater detail hereinafter, the modulator generates an interrupt AVD if the photodiode senses a light pulse at some time other than the times at which light pulses are emitted by the LED 18. Unless an interrupt AVD is generated, the modulator produces the timing signal at either the first frequency $f_1$ or the second frequency $f_2$. As long as the integrator is in one of the terminal states, i.e., X is true, the pulses of the timing signal are generated at the first frequency $f_1$ (indicated by the loop 84).

When the integrator enters one of the transition states, i.e., XN is true, the modulator successively alternates between the frequencies $f_1$ and $f_2$. As indicated by the arrow 86, the modulator transitions from the first frequency $f_1$ to the second frequency $f_2$ when XN is true. After generating one pulse at the second frequency $f_2$, the next pulse is generated at the first frequency $f_1$. This return to the first frequency $f_1$ is indicated by arrow 88, which has no condition associated with it, i.e., the return transition always occurs (unless an interrupt AVD is generated). In essence, while the integrator is in any of the transition states, one pulse is generated at the frequency $f_2$, the next pulse is generated at the frequency $f_1$, the next pulse is generated at the frequency $f_2$, and so on. This can be seen in FIG. 5 during the time period 54 in which the state of the integrator the transitions from the terminal state S7 to the terminal state S0. In the timing signal waveform 46, the time period $T_2$ corresponds to the frequency $f_2$ and the time period $T_1$ corresponds to the frequency $f_1$.

Figure 7:
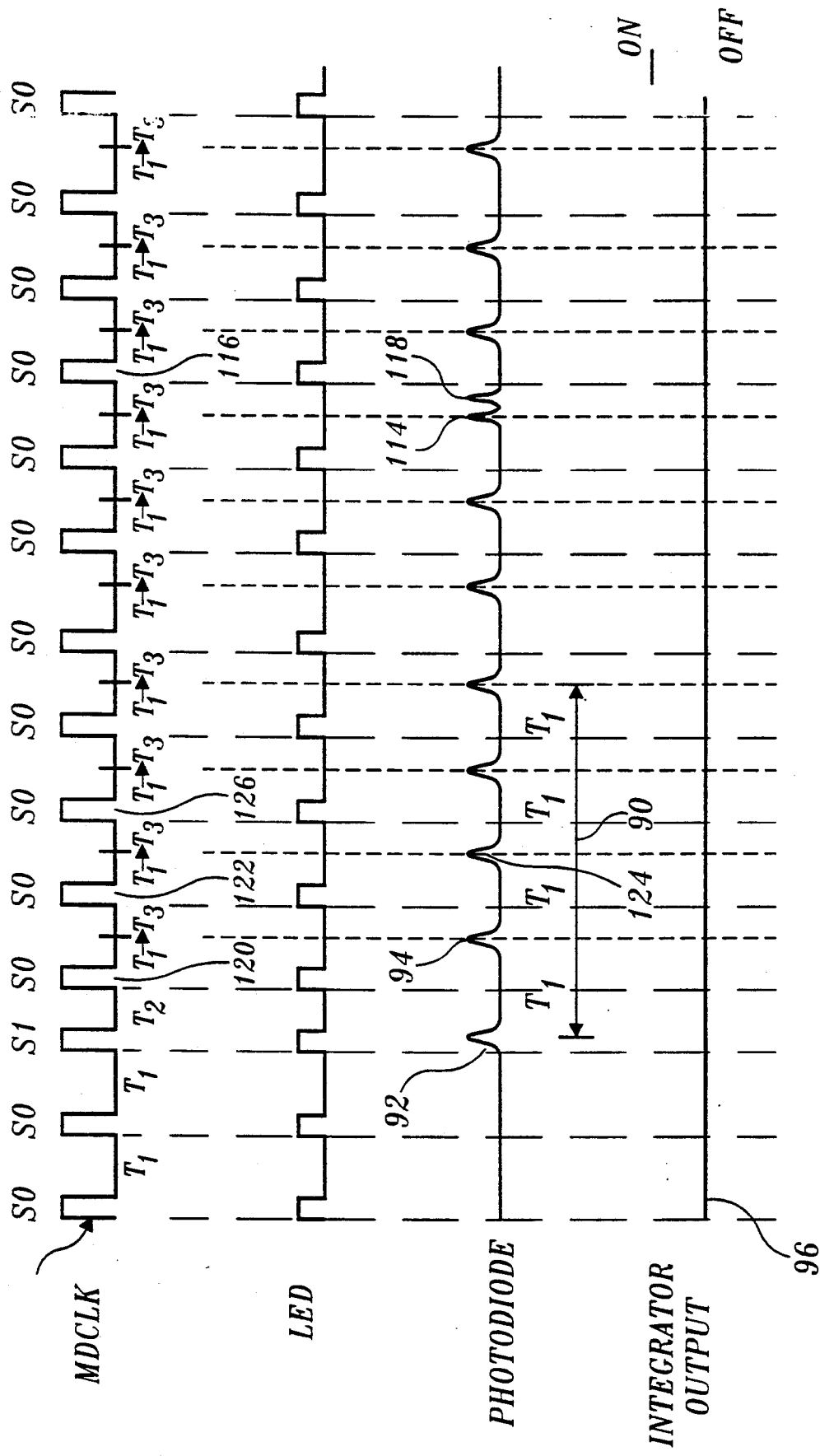
FIG. 7 is a timing diagram illustrating the operation of a transceiver according to this invention in the presence of repetitive noise.

By alternating between the frequencies $f_1$ and $f_2$ when the integrator is in one of the transition states, the transceiver is immune to repetitive noise synchronized with the first frequency $f_1$, i.e., the repetitive noise does not cause the transceiver to falsely indicate that an object is present. This is illustrated in FIG. 7. During the time period labeled 90, repetitive noise at the frequency $f_1$ exists and is initially synchronized with the pulses of the timing signal MDCLK. The noise is represented as spikes on the photodiode signal. The first spike 92 is synchronized with a pulse of the timing signal MDCLK, so that it appears to be a back-reflected LED pulse. As a result, the integrator transitions to the transition state S1. The next spike 94 would also be synchronized with the timing signal MDCLK if the next pulse were generated at the first frequency $f_1$. By switching to the second frequency $f_2$, the spike 94 no longer overlaps with the pulses of the timing signal MDCLK. As a result, the spike is not interpreted as a back-reflected LED pulse and the digital integrator returns to the terminal state S0. Furthermore, as the output of the digital integrator (waveform 96) is characterized by hysteresis, the repetitive spikes do not affect the integrator output. The transceiver consistently indicates that no object is present.

If a light pulse is detected at a time other than the times of the timing pulses, the modulator interrupts the generation of timing pulses for a period of time $T_3$. As previously described with reference to FIG. 1, the modulator 26 receives the output OUT2 from the front end 30 at the input INM of the modulator. This input represents the photodiode signal amplified and filtered by the front end 30. The modulator 26 monitors the input signal INM and, if the signal indicates that a pulse was detected at some time between adjacent pulses of the timing signal, an interrupt signal AVD is generated. The interrupt signal AVD causes an essentially immediate interruption of the timing signal MDCLK. This is an asynchronous transition and is represented by the dash arrows 98 and 100 in FIG. 3. In contrast, the other state transitions are synchronous, i.e., occur at the times of the timing pulses, and are represented with solid arrows.

The asynchronous interrupt can be understood with reference to FIG. 6. A spike 102 is shown on the photodiode signal 72 to occur between the timing pulses 104 and 106. After the timing pulse 104, the modulator is operating at the frequency $f_1$, so that the next pulse 106 would be generated $T_1$ seconds later if an interrupt AVD was not generated. However, when the spike 102 occurs the modulator generates an interrupt AVD. This causes the modulator to generate the next pulse 106 $T_3$ seconds after the time of the spike 102. This interrupt is illustrated in the timing diagram as $T_1 \rightarrow T_3$.

As shown in FIG. 3 by the arrows 108 and 110, the next timing pulse is generated at either the frequency $f_1$ or the frequency $f_2$. As illustrated in FIG. 6, if the integrator is in either of the terminal states (i.e., X is true), the next pulse 112 is generated at the frequency $f_1$. Otherwise, the integrator is in one of the transition states (i.e., XN is true) and the next pulse is generated at the frequency $f_2$.

The modulator 26 will only generate an interrupt signal AVD at times between successive pulses of the timing signal. An interrupt AVD is not generated when a light pulse is detected during a pulse of the timing signal. For example, in FIG. 7 the spike 92 on the photodiode signal occurs within a timing pulse so that no interrupt is generated. Furthermore, once an interrupt AVD is generated, another interrupt will not be generated before the next timing pulse. For example, in FIG. 7 a spike 114 causes an interrupt to be generated so that the next timing pulse 116 is generated $T_3$ seconds after the spike 114. During the time period $T_3$, a second spike 118 occurs. The modulator 26 ignores this spike, i.e., no interrupt is generated.

As a result of generating interrupts AVD and waiting $T_3$ seconds thereafter to generate the next timing pulse, the effect of noise on the transceiver is further reduced. For example, FIG. 7 illustrates how the transceiver is able to avoid interference with repetitive noise at a frequency near the frequency $f_1$. When the spike 92 occurs during a pulse of the timing signal, the modulator switches to the second frequency $f_2$. The next spike 94 then occurs between the timing pulses 120 and 122. This causes an interrupt AVD so that the modulator generates the next timing pulse 122 $T_3$ seconds after the spike 94. When the spike 124 occurs, another interrupt AVD is generated and the next timing pulse 126 is generated $T_3$ seconds later. This pattern is continued, so that the timing pulses are generated $T_3$ seconds after each of the repetitive spikes. In essence, the timing signal MDCLK is synchronized with the repetitive noise so that there is no overlap between the repetitive noise and the pulses of the timing signal. As a result, the repetitive noise does not interfere with the operation of the transceiver, i.e., the spikes do not cause the integrator to enter one of the transition states.

Generating the interrupts is particularly useful for avoiding interference with other similar transceivers. In a typical application, several transceivers are used to determine whether an object is present in a particular target region. Existing transceivers can interfere with one another. The interrupt scheme utilized by the transceiver provided by this invention prevents transceiver interference, so that several transceivers built in accordance with this invention can be used in close proximity with one another.

Figure 8:
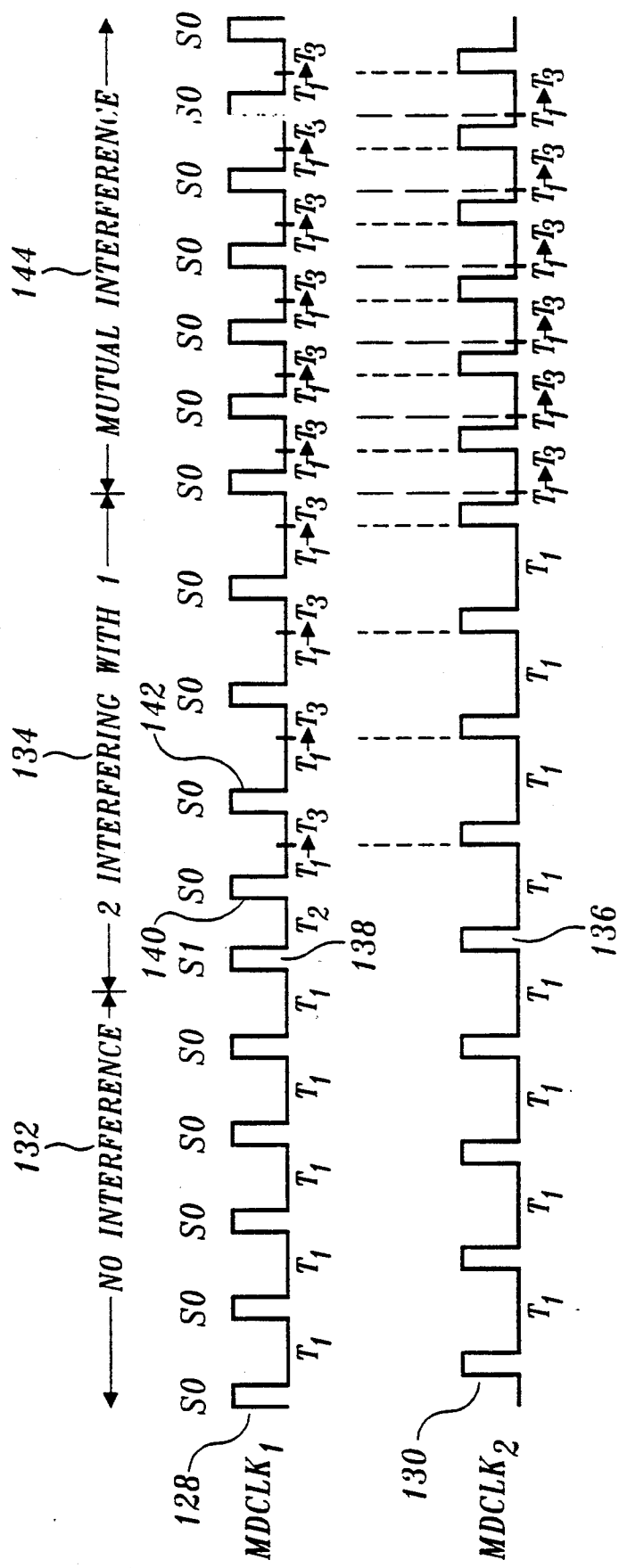
FIG. 8 is a timing diagram illustrating the operation of a transceiver according to this invention in the presence of other similar transceivers.

FIG. 8 illustrates how the interrupt logic avoids transceiver-transceiver interference. The timing signals of two similar transceivers are shown. The waveform 128 represents the timing signal $MDCLK_1$ of a first transceiver, and the waveform 130 represents the timing signal $MDCLK_2$ of a second transceiver. Transceivers interfere with one another when the light pulses from one transceiver are sensed by the photodiode of another transceiver. During the time period 132, there is no interference between the transceivers. The timing signal of each transceiver is not affected by the other transceiver.

During the time period 134, for some reason, the first transceiver begins to sense the light pulses from the second transceiver, e.g., the transceivers are moved or the gain of the first transceiver is increased. The timing pulse 136 of the second transceiver overlaps with the timing pulse 138 of the first transceiver. As a result, the first transceiver interprets the light pulse from the second transceiver as its own light pulse reflected back. The integrator of the first transceiver changes to the first transition state S1 so that the next pulse of its timing signal is generated after $T_2$ seconds. This switch in frequency causes the next pulse of the second transceiver to be generated between the pulses 140 and 142 of the first transceiver. The first transceiver senses this pulse and generates an interrupt AVD. The next pulse 142 of the first transceiver is generated $T_3$ seconds after the interrupt. Thereafter, the first transceiver generates an interrupt AVD at the time of each pulse of the second transceiver. The pulses of the first transceiver are generated nearly at the midpoint between successive pulses of the second transceiver. As a result, the second transceiver no longer interferes with the operation of the first transceiver, i.e., the light pulses from the second transceiver do not cause the internal state of the integrator of the first transceiver to change.

During the time period 144 of the hypothetical timing diagrams shown in FIG. 8, there is mutual interference between the first and second transceivers, i.e., the first transceiver senses the light pulses from the second transceiver and the second transceiver senses the light pulses from the first transceiver. The first transceiver continues generating an interrupt AVD each time a light pulse from the second transceiver is received. The second transceiver similarly generates an interrupt each time a light pulse from the first transceiver is detected. As a result, the timing signals of the first and second transceivers are synchronized, with the pulses of one transceiver occurring at approximately the midpoint between successive pulses of the other transceiver, thereby preventing any transceiver interference. With reference to the state diagram in FIG. 3, each transceiver continuously generates interrupts. $T_3$ seconds after an interrupt AVD is generated, a transceiver generates a pulse and then switches back to the first frequency $f_1$. However before the next pulse can be generated at the frequency $f_1$, another interrupt AVD is generated so that the modulator generates the next pulse $T_3$ seconds later.

Because of inherent differences in the electronics of each transceiver, the frequencies $f_1$ and $f_2$ of one transceiver will differ somewhat from the frequencies $f_1$ and $f_2$ of another transceiver. For example, as shown in FIG. 8, the frequency of $MDCLK_2$ is slightly slower than the frequency of $MDCLK_1$. These differences are desirable, as they prevent two transceivers from exactly synchronizing with one another. For example, because of the differences in frequencies, the light pulses from one transceiver cannot remain synchronized with the timing pulses of another transceiver so as to put the other transceiver in the terminal state S7.

To ensure proper operation of the transceiver, the frequencies $f_1$ and $f_2$ and the time period $T_3$ should be chosen in relation to one another. The second frequency $f_2$ should differ from the first frequency $f_1$ by at least 0.5%, but not more than 20%. The time period $T_3$ should be at least 25% shorter than the time period $T_1$ (i.e., $1/f_1$), but not more than 65% smaller. That is, $T_3$ is between 35% to 75% of $T_1$. In one preferred embodiment, the frequency $f_1$ is 1/16th of the frequency of the system clock SCLK generated by the oscillator 40, the frequency $f_2$ is 1/15th of the system clock SCLK frequency, and the time period $T_3$ is nine cycles of the system clock SCLK. In this preferred embodiment the frequency of the system clock SCLK is approximately 50 KHz. The difference between the frequencies $f_1$ and $f_2$ shown in the timing diagrams is greater than in this preferred embodiment so as to facilitate the explanation of frequency modulation.

Stability Indicator

The stability indicator circuit provides an indication of whether the transceiver operation is stable. When operating stably, the internal state of the integrator 34 is generally one of the terminal states S0 or S7; the integrator is only briefly in the transition states S1–S6. In contrast, if the transceiver intermittently falsely determines that an LED pulse was reflected off an object or does not sense back-reflected LED pulses, the transceiver operation is not stable. As a result, during unstable operation, a significant number of erroneous indications of whether emitted LED pulses are reflected back occur. Such unstable operation can result from improper adjustment of the transceiver gain and from other various problems. With reference to the state diagram of the digital integrator in FIG. 2, the Boolean variables I and IN would be erroneous. For example, during unstable operation, despite an object being present in the target region 12, the Boolean variable IN would be true a significant number of times. Such erroneous determinations of the Boolean variables I and IN would result in the digital integrator occupying one of the transition states S1–S6 a significant amount of time. The integrator can also be forced into a false terminal state, which would affect the output of the transceiver.

The stability indicator circuit indicates that the transceiver operation is not stable when the internal state of the digital integrator is consistently occupying one of the transition states. When the digital integrator is consistently in one of the terminal states S0 or S7, the stability indicator provides an indication of stable operation. The stability indicator can be used during installation and maintenance of a transceiver formed in accordance with the invention. When a transceiver 10 is initially installed, the gain of the front end 30 should be adjusted so that the reflection of LED pulses off an object in the target region 12 are properly detected, and so that reflections off some other object, e.g., a wall outside of the target region, are not detected. In existing transceivers, a stability indication is typically provided by analog circuitry. The stability indicator provided by this invention utilizes digital logic that can be implemented in digital circuitry.

Figure 4:
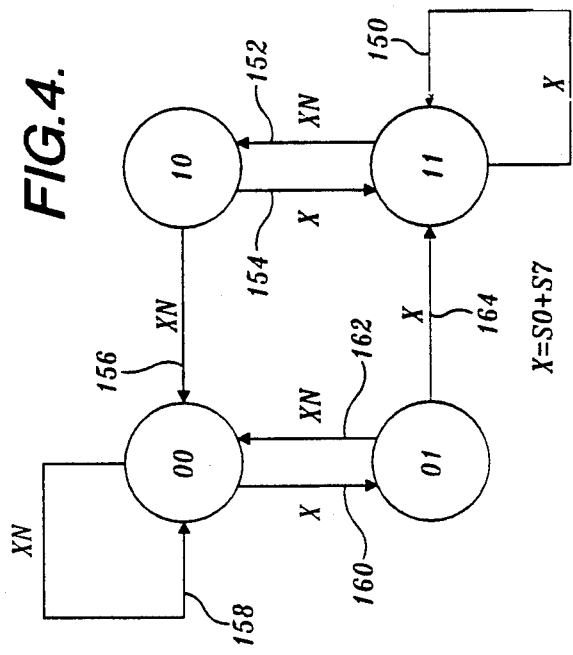
FIG. 4 is a state diagram specifying the operation of the stability indicator shown in FIG. 1.

The stability indicator circuit 42 operates in accordance with the state diagram shown in FIG. 4. The stability indicator 42 processes the inputs DETC and NODETC that indicate whether or not the digital integrator 34 is in one of the terminal states S0 or S7. The result of this processing is such that the stability indicator assumes one of the four states shown in FIG. 4. The state of the stability indicator is updated at times synchronized with the timing signal MDCLK as illustrated by the solid arrows interconnecting the states. The Boolean variables X and XN dictate transitions between the four states. The Boolean variables X and XN represent the same conditions as in FIG. 3, i.e., X is true when the integrator is in one of the terminal states and XN is true when the integrator is in one of the transition states. The state diagram in FIG. 4 includes two terminal states 00 and 11. The terminal state 11 indicates that the transceiver operation is stable, and the state 00 indicates that the transceiver operation is unstable. The stability indicator includes two transition states 10 and 01 between the two terminal states.

When the digital integrator 34 is in one of its terminal states S0 or S7, the stability indicator assumes the stable state 11. The stability indicator remains in the stable state 11 as long as the digital integrator remains in one of its terminal states. This is illustrated by the loop 150. At the first timing pulse in which the digital integrator enters one of the transition states, the stability indicator state changes to the state 10 (indicated by the arrow 152). At the next timing pulse, if the integrator returns to one of its terminal states, the stability indicator returns to the stable state 11 (indicated by arrow 154). Otherwise, the integrator is in one of its transition states and the stability indicator changes to the unstable state 00 (indicated by the arrow 156). Once in the unstable state 00, the stability indicator remains in the unstable state as long as the digital integrator remains in one of the transition states (indicated by the loop 158).

While in the unstable state 00, the stability indicator changes to the state 01 when the digital integrator enters one of its terminal states (indicated by the arrow 160). As indicated by the arrow 162, the stability indicator returns to the unstable state 00 if the digital integrator enters one of its transition states at the next timing pulse. Otherwise, the integrator is in one of its terminal states and the stability indicator changes to the stable state 11 (indicated by the arrow 164).

The state diagram shown in FIG. 4 represents the internal state of the stability indicator 42. The stability indicator generates an output OUTSI that is supplied to some external device 44. The output OUTSI is generated by processing the internal state with hysteresis logic. Specifically, the output signal OUTSI indicates one of two states: stable operation, or unstable operation. When the internal state of the stability indicator is the state 11, the output signal OUTSI indicates stable operation, and when the internal state is the state 00, the output signal OUTSI indicates unstable operation. The output signal OUTSI is characterized by hysteresis in that the signal does not change when the internal state is either of the states 10 or 01. The output signal OUTSI does not change until the internal state of the stability indicator assumes a new terminal state, i.e., the state 00 or the state 11.

Circuit-Level Implementation of the Transceiver

Based upon the block diagram provided in FIG. 1, the state diagrams provided in FIGS. 2–4 and the timing diagrams provided in FIGS. 5–8, persons skilled in the art of digital and analog circuit design can readily produce a transceiver in accordance with the invention. Prior to describing preferred implementations of each of the blocks shown in FIG. 1, preferred external inputs and outputs of the transceiver 10 are described. As shown in FIG. 1 and explained previously herein, the sample and compare circuit 32 preferably has an input MODE that allows selecting the duty factor of the modulator 26 and the response rate of the digital integrator 34. Preferably, the input MODE is an external pin on the transceiver that can be connected to ground, the voltage source powering the transceiver, or can be left unconnected so as to float. Preferably, the sample and compare circuit 32 is made responsive to each of these three connections. For example, in one embodiment, if the MODE input pin is floating, the sample and compare circuit will select a timing signal duty factor of 6% via the output DFT connected to the modulator 26, and the fast response mode of the digital integrator 34 is selected via the output RSP connected to the digital integrator. In this embodiment, if the MODE pin is either connected to ground or the voltage source, the sample and compare circuit selects the slow response mode of the digital integrator. When the MODE pin is ground or floating a duty factor of 6% is selected, and when the MODE pin is connected to the voltage source a duty factor of 1% is selected.

The oscillator 40 preferably has an external input REXT that can be connected to an external resistor for selecting the time base of the oscillator 40 (i.e., the frequency of the system clock SCLK). Further, the transceiver preferably has a RESET pin that allows the transceiver to be reset. As shown in FIG. 1, the RESET pin is connected to an input of the modulator 26, the stability indicator 42, the digital integrator 34, and the output drive 36, each input labeled RESET. When the transceiver is reset via the RESET pin, the modulator returns to the first frequency $f_1$, the digital integrator returns to the terminal state S0, the output of the output drive 36 is reset to indicate that no object is present and the stability indicator is reset to the terminal state 00.

The output drive circuit 36 has an external output OUTOD that is used to drive some external device. For example, as shown in FIG. 1, the output can be used to drive the external device 38, which, as noted above, may be a light source such as an LED. Alternatively, the output could be connected to some other electronic control or monitor circuitry. The output drive circuit preferably includes an input INV that allows one to select whether the output OUTOD is high or low when an object is present. The stability indicator 42 produces a similar output OUTSI for driving the other external device 44, which could also be a light source, such as an LED. A light source connected to the output of the stability indicator will provide a technician with a visual indication of whether the transceiver operation is stable. Using this indication, a technician can adjust the transceiver gain until transceiver operation is stable. Alternatively, the output OUTSI could derive some other control circuitry.

The circuitry of each of the blocks in FIG. 1 can be implemented using existing analog and digital circuit designs and components. The front end circuit 30 preferably comprises analog circuitry for amplifying the output of the photodiode 22. Preferably, the gain can be externally adjusted. The front end circuit preferably also includes two filter stages for filtering the amplified signal. The first filter stage is a band-pass filter that produces the output OUT2 and the second stage is a low-pass filter that filters the output of the first stage to produce the output OUTFE so that OUTFE consists of the low frequency contents of OUT2.

The sample and compare circuit 32 can be formed with typical analog circuitry that samples and compares analog signals. The sample and compare circuit samples the output of the front end circuit OUTFE to determine whether or not a light pulse was detected during a pulse of the timing signal. This determination can be generated by several sample and compare schemes. For example, the sample and compare circuit 32 could take several samples of the output signal OUTFE during the pulse of the timing signal to generate an indication of signal strength during that time period. The signal strength would then be compared to the signal strength sensed just prior to the pulse of the timing signal. Alternatively, the signal strength could be sensed twice, once on the leading edge of each timing pulse and once on the falling edge of each timing pulse. The two samples would then be compared to determine whether or not an LED pulse was detected. The signal strength at the falling edge of the timing pulse exceeding the signal strength at the leading edge could indicate that an LED pulse was detected. This alternative could be accomplished by, for example, having the sample and compare circuit 32 sample and store the signal strength at the leading edge of the timing pulse and outputting the difference between the stored value and the signal strength during the remainder of the timing pulse. The digital integrator could then sample the output signal OUTSC from the sample and compare circuit at the falling edge of the timing pulse to determine whether or not an LED pulse was detected. The sample and compare circuit also includes logic circuitry to process the MODE input, so as to select the response rate of the digital integrator and the duty factor of the modulator via the outputs RSP and DFT.

As previously described, the logic of the digital integrator 34, the modulator 26, and the stability indicator 42 specified in the state diagrams in FIGS. 2-4 can be implemented with custom digital logic serving as state machines or with available digital processors. The digital integrator includes digital logic circuitry for performing a digital integration as specified by the state diagram in FIG. 2 and for generating the outputs OUT, DETC, and NODTC. The digital integrator 34 also includes logic circuitry to respond to the response rate selection input RSP and the reset input RESET.

The modulator 26 includes frequency divider circuitry to produce the timing signal MDCLK. The timing signal frequency is a fraction of the frequency of the system clock SCLK. The modulator 26 includes logic circuitry to select the amount of division of the system clock SCLK based upon the inputs DETC and NODTC as specified in FIG. 3. The modulator also includes logic circuitry for selecting the duty factor of the timing signal based on the input DFT and for resetting the frequency to $f_1$ when the transceiver is reset via the RESET pin. Furthermore, the modulator also includes analog circuitry for sampling the input INM during times between successive pulses of the timing signal and determining when a pulse is detected during these times. For example, this could be accomplished with a comparator comparing the input INM to a predefined threshold. The output of the compartor is masked during pulses of the timing signals and during interrupts AVD for $T_3$ seconds. Logic circuitry is included to monitor the comparator output and generate interrupts AVD as previously described with reference to FIG. 3.

The stability indicator circuit includes digital logic that generates the stability indication as specified by the state diagram in FIG. 4. The stability indicator circuit also includes typical drive circuitry for driving the output OUTSI. The output drive 36 and LED drive 28 are also typical drive circuits that are well known in the electronic circuit art.

The oscillator 40 can be one of several standard oscillators currently available. As will be readily recognized by those skilled in circuit design, the digital logic of the various blocks in FIG. 1 must be properly synchronized. For simplicity, the preceding discussion assumed that all circuitry was synchronized with the pulses of the timing signal MDCLK. Actually, the logic of certain blocks is slightly delayed to allow completion of the operations of other blocks. For example, the digital integrator logic shown in the state diagram of FIG. 2 is slightly delayed to allow the integrator input IN time to settle. The delay can be achieved by applying the oscillator output SCLK and delaying the logic of the digital integrator by one cycle of the system clock SCLK.

While the presently preferred embodiment of the invention has been illustrated and described, it will be appreciated that various changes can be made therein without departing from the spirit and scope of the invention. For example, additional transition states could be added to the digital integrator logic in FIG. 2. This may be desirable if the transceiver is used in very high noise environments. Increasing the number of transition states would make the transceiver output further immune to noise. Also, the stability indicator could include additional transition states between the terminal states 00 and 11. For example, if the terminal states 00 and 11 are separated by seven transition states, instead of one as shown, the output of the stability indicator will not change when the integrator makes a normal transition between the terminal states S0 and S7. Furthermore, the invention could be used as part of a through-beam detection system or a proximity detection system. In a through-beam detection system a light source would be placed on one side of a region and a light sensor would be placed at the opposite side of the region to sense light pulses from the light source when no object is present in the region. In a proximity detection system an electromagnetic source and an electromagnetic sensor would be used in place of the light source and light sensor so that metal objects in close proximity to the sensor would be detected. Thus, it is to be understood that within the scope of the appended claims, various changes can be made in the specifically disclosed embodiments of the invention.

The embodiments of the invention in which an exclusive property or privilege is claimed are defined as follows:

1. A photoelectric transceiver for detecting the presence and absence of an object in a preselected region, said photoelectric transceiver including:
   (a) modulation means, including first input means, for: (i) receiving a first input signal indicative of one of a series of states, said series of states including: (1) object being detected in a preselected region, (2) no object being detected in said preselected region, and (3) transitioning between said states of object being detected and no object being detected; and (ii) generating a timing signal including a sequence of pulses, the frequency of said timing signal pulses alternating between at least two preselected frequencies when said first input signal is indicative of a transition between said states of an object being detected and no object being detected;

(b) light emission means, coupled to said modulation means, for receiving said timing signal and emitting pulses of light towards said preselected region at times synchronized with the pulses of said timing signal;

(c) light sensing means, coupled to said modulation means, for receiving said timing signal, and detecting the presence and absence of light pulses coming from said preselected region and generating a synchronized-light-pulse detection signal indicative of whether or not a light pulse is detected at times synchronized with the pulses of said timing signal; and (d) processing means, coupled to said light sensing means and said modulation means, for receiving said synchronized-light-pulse detection signal, processing said synchronized-light-pulse detection signal, generating said first input signal and applying said first input signal to said modulation means.

2. The photoelectric transceiver claimed in claim 1, wherein the frequency of said timing signal pulses is one of said at least two preselected frequencies when said input signal is indicative of said state of an object being detected.

3. The photoelectric transceiver claimed in claim 2, wherein the frequency of said timing signal pulses is one of said at least two preselected frequencies when said first input signal is indicative of said state of no object being detected.

4. The photoelectric transceiver claimed in claim 3, wherein:

said processing means are coupled to said modulation means for receiving said timing signal;

said processing means includes means for generating said first input signal by maintaining a detection count that is updated at times synchronized with the pulses of said timing signal, said detection count being incremented if said synchronized-light-pulse detection signal indicates a light pulse was detected and being decremented if said synchronized-light-pulse detection signal indicates a light pulse was not detected, the value of said detection count being limited between an upper limit and a lower limit; and said first input signal is indicative of said state of object being detected when the value of said detection count is said upper limit, said first input signal is indicative of said state of no object being detected when the value of said detection count is said lower limit, and said first input signal is indicative of said state of transitioning between said states of object being detected and no object being detected when the value of said detection count is between said lower limit and said upper limit.

5. The photoelectric transceiver claimed in claim 4, wherein said at least two preselected frequencies differ from each other by not less than 0.5% and not more than 20%.

6. The photoelectric transceiver claimed in claim 5, wherein said transceiver includes stability indication means, coupled to said modulation means and said processing means, for receiving said timing signal and said first input signal, processing said first input signal and generating a stability signal indicative of whether or not the operation of said transceiver is stable, said stability signal indicating that the transceiver operation is stable when said first input signal remains in said state of object being detected for more than a preselected number of consecutive pulses of said timing signal, said stability signal indicating that the transceiver operation is stable when said first input signal remains in said state of no object being detected for more than said preselected number of consecutive pulses of said timing signal, and said stability signal indicating that the transceiver operation is unstable when said first input signal remains in said state of transitioning between said states of object being detected and no object being detected for more than said preselected number of consecutive pulses of said timing signal.

7. The photoelectric transceiver claimed in claim 6, wherein:

said light sensing means includes means for generating an asynchronous-light-pulse detection signal that is indicative of when light pulses are detected; and said modulation means includes means, coupled to said light sensing means, for receiving said asynchronous-light-pulse detection signal, processing said asynchronous-light-pulse detection signal, and generating an interrupt signal when a light pulse is sensed at a time other than the times of the pulses of said timing signal, said modulation means including means responsive to said interrupt signal such that when said interrupt signal is generated said modulation means waits a preselected period of time until generating the next timing signal pulse.

8. The photoelectric transceiver claimed in claim 1, wherein:

said processing means are coupled to said modulation means to receive said timing signal;

said processing means includes means for generating said first input signal by maintaining a detection count that is updated at times synchronized with the pulses of said timing signal, said detection count being incremented if said synchronized-light-pulse detection signal indicates a light pulse was detected and being decremented if said synchronized-light-pulse detection signal indicates a light pulse was not detected, the value of said detection count being limited between an upper limit and a lower limit; and said first input signal is indicative of said state of object being detected when the value of said detection count is said upper limit, said first input signal is indicative of said state of no object being detected when the value of said detection count is said lower limit, and said first input signal is indicative of said state of transitioning between said states of object being detected and no object being detected when the value of said detection count is between said lower limit and said upper limit.

9. The photoelectric transceiver claimed in claim 1, wherein said at least two preselected frequencies differ from each other by not less than 0.5% and not more than 20%.

10. The photoelectric transceiver claimed in claim 1, wherein said transceiver includes stability indication means, coupled to said modulation means and said processing means, for receiving said timing signal and said first input signal, processing said first input signal and generating a stability signal indicative of whether or not the operation of said transceiver is stable, said stability signal indicating that the transceiver operation is stable when said first input signal remains in said state of object being detected for more than a preselected number of consecutive pulses of said timing signal, said stability signal indicating that the transceiver operation is stable when said first input signal remains in said state of no object being detected for more than said preselected number of consecutive pulses of said timing signal, and said stability signal indicating that the transceiver operation is unstable when said first input signal remains in said state of transitioning between said states of object being detected and no object being detected for more than said preselected number of consecutive pulses of said timing signal.

11. The photoelectric transceiver claimed in claim 1, wherein:
said light sensing means includes means for generating an asynchronous-light-pulse detection signal that is indicative of when light pulses are detected; and
said modulation means includes means, coupled to said light sensing means, for receiving said asynchronous-light-pulse detection signal, processing said asynchronous-light-pulse detection signal, and generating an interrupt signal when a light pulse is sensed at a time other than the times of the pulses of said timing signal, said modulation means including means responsive to said interrupt signal such that when said interrupt signal is generated said modulation means waits a preselected period of time until generating the next timing signal pulse.

12. The photoelectric transceiver claimed in claim 11, wherein said at least two preselected frequencies differ from each other by not less than 0.5% and not more than 20%.

13. The photoelectric transceiver claimed in claim 12, wherein said preselected period of time is a value between 35% of the period of the highest of said at least two preselected frequencies and 75% of the period of the lowest of said at least two preselected frequencies.

14. The photoelectric transceiver claimed in claim 3, wherein:
said light sensing means includes means for generating an asynchronous-light-pulse detection signal that is indicative of when light pulses are detected; and
said modulation means includes means, coupled to said light sensing means, for receiving said asynchronous-light-pulse detection signal, processing said asynchronous-light-pulse detection signal, and generating an interrupt signal when a light pulse is sensed at a time other than the times of the pulses of said timing signal, said modulation means including means responsive to said interrupt signal such that when said interrupt signal is generated said modulation means waits a preselected period of time until generating the next timing signal pulse.

15. A photoelectric transceiver for detecting the presence and absence of an object in a preselected region, said photoelectric transceiver including:
(a) modulation means for generating a timing signal including a sequence of pulses;
(b) light emission means, coupled to said modulation means, for receiving said timing signal and emitting pulses of light towards a preselected region at times synchronized with the pulses of said timing signal;
(c) light sensing means, coupled to said modulation means, for receiving said timing signal, and detecting the presence and absence of light pulses coming from said preselected region at times synchronized with the pulses of said timing signal and generating a light-pulse detection signal indicative of whether or not a light pulse is detected at each of these times;
(d) processing means, coupled to said light sensing means, for receiving said light-pulse detection signal, and processing said light-pulse detection signal so as to generate a resultant signal indicative of one of a series of states, said series of states including: (i) object being detected in said preselected region, (ii) no object being detected in said preselected region, and (iii) transitioning between said states of object being detected and no object being detected; and
(e) stability indication means, coupled to said modulation means and said processing means, for receiving said timing signal and said resultant signal, processing said resultant signal and generating a stability signal indicative of whether or not the operation of said transceiver is stable, said stability signal indicating that the transceiver operation is stable when said resultant signal remains in said state of object being detected for more than a preselected number of consecutive pulses of said timing signal, said stability signal indicating that the transceiver operation is stable when said resultant signal remains in said state of no object being detected for for more than said preselected number of consecutive pulses of said timing signals, and said stability signal indicating that the transceiver operation is unstable when said resultant signal remains in said state of transitioning between said states of object being detected and no object being detected for more than said preselected number of consecutive pulses of said timing signal.

16. The photoelectric transceiver claimed in claim 15, wherein said preselected number of consecutive pulses of said timing signal is two.

17. A photoelectric transceiver for detecting the presence and absence of an object in a preselected region, said photoelectric transceiver including:
(a) modulation means, including first input means, for: (i) receiving a first input signal indicative of one of a series of states, said series of states including: (1) object being detected in a preselected region, (2) no object being detected in said preselected region, and (3) transitioning between states of object being detected and no object being detected; and (ii) generating a timing signal including a sequence of pulses, wherein said timing signal is generated as a first pattern of pulses when said first input signal is indicative of an object being detected, and said timing signal is generated as a second pattern of pulses when said first input signal is indicative of a transition between said states of an object being detected and no object being detected, said first pattern of pulses differing from second pattern of pulses;

(b) light emission means, coupled to said modulation means, for receiving said timing signal and emitting pulses of light towards said preselected region at times synchronized with the pulses of said timing signal;

(c) light sensing means, coupled to said modulation means, for receiving said timing signal, and detecting the presence and absence of light pulses coming from said preselected region and generating a synchronized-light-pulse detection signal indicative of whether or not a light pulse is detected at times synchronized with the pulses of said timing signal; and (d) processing means, coupled to said light sensing means and said modulation means, for receiving said synchronized-light-pulse detection signal, processing said synchronized-light-pulse detection signal, generating said first input signal and applying said first input signal to said modulation means.

18. The photoelectric transceiver claimed in claim 17, wherein:

said light sensing means includes means for generating an asynchronous-light-pulse detection signal that is indicative of when light pulses are detected; and said modulation means includes means, coupled to said light sensing means, for receiving said asynchronous-light-pulse detection signal, processing said asynchronous-light-pulse detection signal, and generating an interrupt signal when a light pulse is sensed at a time other than the times of the pulses of said timing signal, said modulation means including means responsive to said interrupt signal such that when said interrupt signal is generated said modulation means waits a preselected period of time until generating the next timing signal pulse.

19. The photoelectric transceiver claimed in claim 18, wherein said transceiver includes stability indication means, coupled to said modulation means and said processing means, for receiving said timing signal and said first input signal, processing said first input signal and generating a stability signal indicative of whether or not the operation of said transceiver is stable, said stability signal indicating that the transceiver operation is stable when said first input signal remains in said state of object being detected for more than a preselected number of consecutive pulses of said timing signal, said stability signal indicating that the transceiver operation is stable when said first input signal remains in said state of no object being detected for more than said preselected number of consecutive pulses of said timing signal, and said stability signal indicating that the transceiver operation is unstable when said first input signal remains in said state of transitioning between said states of object being detected and no object being detected for more than said preselected number of consecutive pulses of said timing signal.

20. The photoelectric transceiver claimed in claim 19, wherein said timing signal is generated as said first pattern of pulses when said first input signal is indicative of no object being detected.

* * * * *